M. BARNHOUSE.
TRANSMISSION MECHANISM.
APPLICATION FILED MAR. 10, 1917.
1,264,359.
Patented Apr. 30, 1918.
2 SHEETS—SHEET 2.
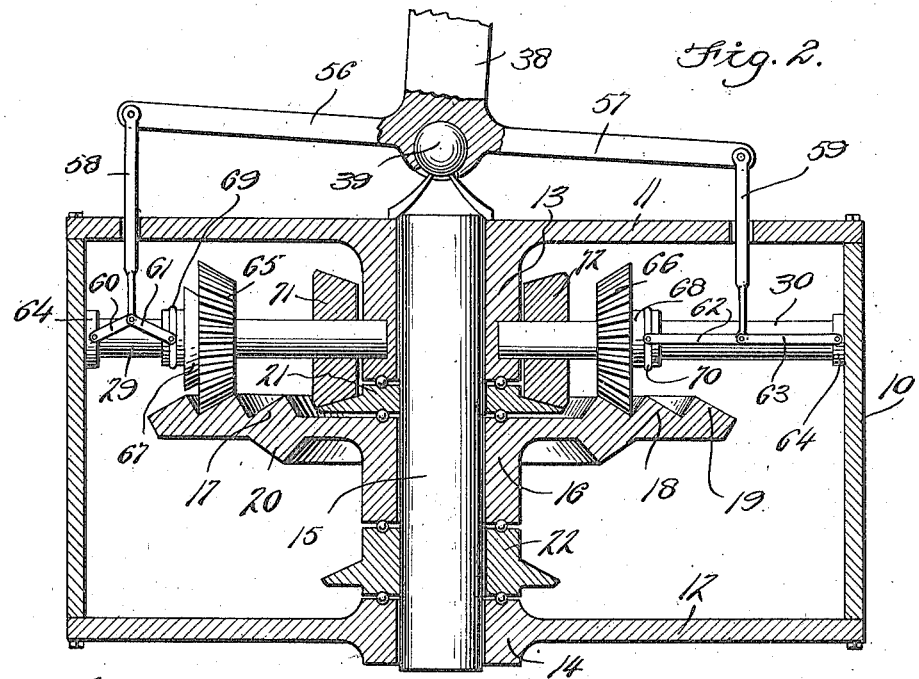
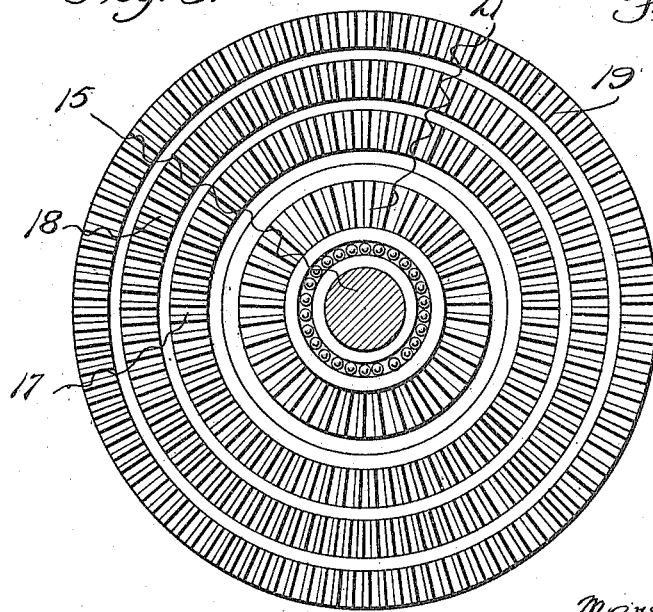
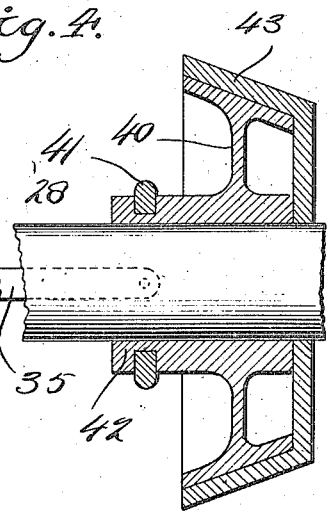
INVENTOR
Marshall Barnhouse,
WITNESSES
BY
ATTORNEY

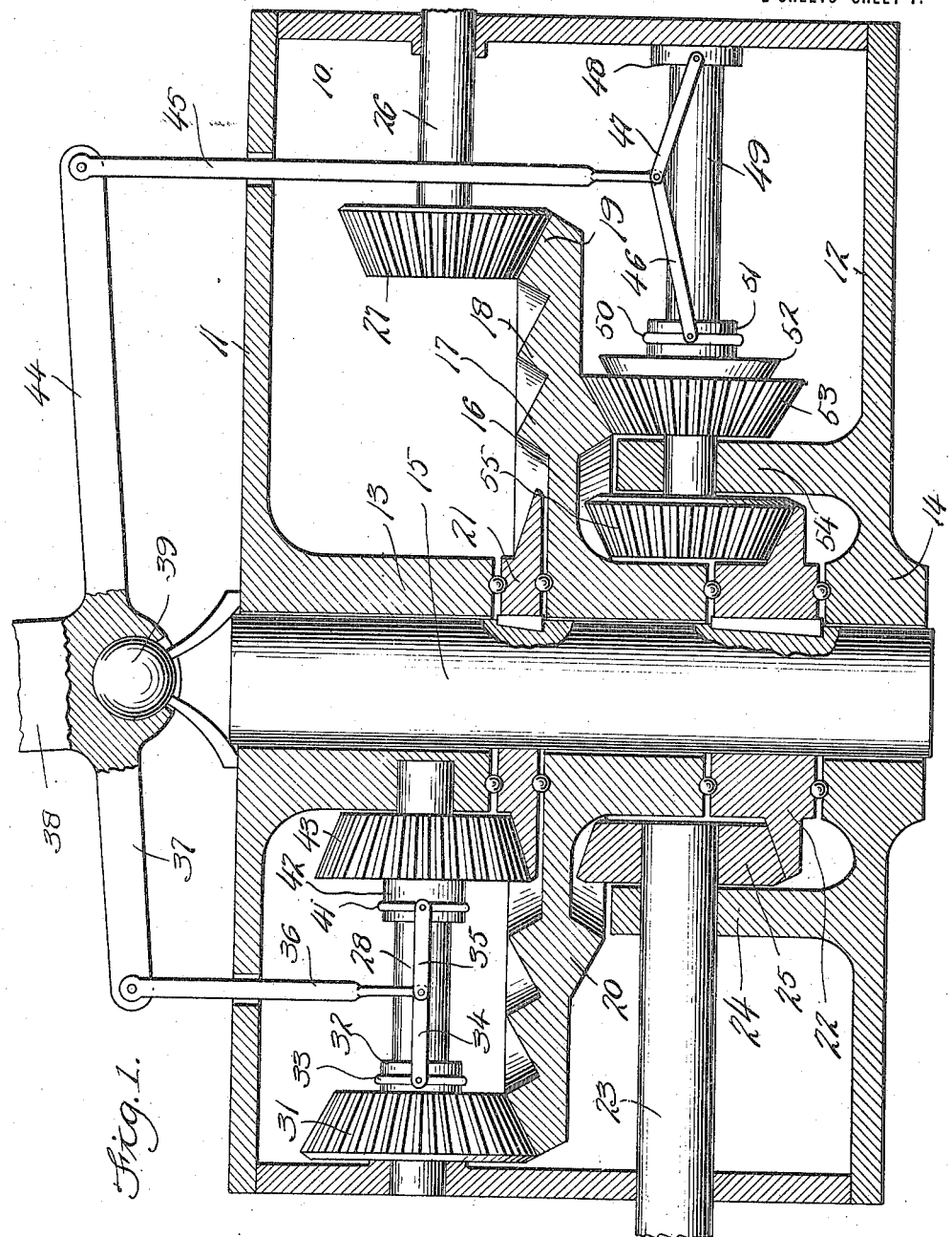

UNITED STATES PATENT OFFICE.

MARSHALL BARNHOUSE, OF HOLLISTER, IDAHO.

TRANSMISSION MECHANISM.

1,264,359.  Specification of Letters Patent.  Patented Apr. 30, 1918.

Application filed March 10, 1917. Serial No. 153,990.

*To all whom it may concern:*

Be it known that I, MARSHALL BARNHOUSE, a citizen of the United States, residing at Hollister, in the county of Twin Falls and State of Idaho, have invented certain new and useful Improvements in Transmission Mechanism, of which the following is a specification.

This invention relates to an improved transmission mechanism and the principal object of the invention is to provide a transmission mechanism in which the gears may be at all times enmeshed, clutches being provided for the various gears so that they may be brought into and out of operative engagement with the shaft upon which they are mounted.

Another object of the invention is to provide an improved type of shifting lever for the clutches, the lever being pivotally mounted and having arms connected with the clutches by links so that the gears may be selectively brought into engagement.

Another object of the invention is to provide a transmission mechanism in which the principal element thereof with the exception of the shifting lever will be mounted in a housing and thus protected from exposure.

Another object of the invention is to provide a transmission mechanism which will be very compact thus taking up a small amount of room.

This invention is illustrated in the accompanying drawings, wherein:—

Figure 1 is a view showing the improved transmission mechanism in section,

Fig. 2 is a vertical sectional view through the improved transmission mechanism taken at right angles to the view in Fig. 1.

Fig. 3 is a plan view of the main gear plate of the transmission, and

Fig. 4 is a fragmentary sectional view showing one of the gears with the clutch in operative engagement therewith.

This transmission is contained in a housing 10, the upper and lower walls 11 and 12 of which are provided with bearings 13 and 14 to rotatably mount the shaft 15. A main gear plate 16 having sets of gear teeth 17, 18, 19 and 20 is rotatably mounted upon the shaft 15 between the gear plates 21 and 22 which are keyed to the shaft 15, anti-friction rollers being positioned as shown in Figs. 1 and 2, so that the gear plates 16, 21 and 22 may rotate easily. From an inspection of Figs. 1 and 2, it will be readily seen that by means of the arrangement shown, the direction of rotation of shaft 15 may be controlled and thus the rotation of the driving shaft 23 controlled. This driving shaft 23 which leads to the driving axle of the automobile or other machine, extends into the housing and is rotatably supported at its inner end by the bearing 24 and carries a gear 25 rigidly mounted upon the driving shaft and having its teeth meshing with the teeth of the gear 22.

In order to transmit rotary movement from the engine shaft 26 to the gear plate 16, there has been provided a gear 27 rigidly mounted upon the engine shaft and meshing with the set of gear teeth 19. This gear plate 16 will therefore be continuously rotated whenever the engine shaft is rotating. Shafts 28, 29 and 30 are rotatably mounted in the housing with their ends journaled in the walls of the housing and in the bearing sleeve 13 and carry gears for meshing with the teeth of the gear plate 16 and also gears for meshing with the teeth of the gear 21. The gear 31 is rigid upon shaft 28 and is provided with an extension or neck 32 carrying a collar 33 with which is connected the link 34. This link 34 together with link 35 is connected with the link 36 extending downwardly into the housing from the arm 37 of the shifting lever 38. It will thus be seen that when the shifting lever is moved upon its bearing 39 to vertically adjust link 36, the links 34 and 35 will be moved thus adjusting the clutch 40 through the medium of the collar 41 loosely mounted upon the neck 42 of the clutch. When this clutch is in the position shown in Fig. 4, it will engage the gear 43 and as this gear 43 meshes with the gear 21, the gear will be rotated and thus the shaft 15 rotated to transmit rotary movement to the driving shaft 23 at low speed.

From the opposite side of the shafting lever 38 there extends an arm 44 carrying a depending link 45 which extends into the housing and is pivotally connected with branch links 46 and 47. The branch link 47 is connected with the bearing 48 in which the shaft 49 is mounted and the branch link 46 is connected with the collar 50 loosely mounted upon the neck 51 of the clutch 52. When the shifting lever is swung to draw link 36 upwardly and move the clutch 40 to an inoperative position, the link 45 will be moved downwardly and the clutch 52 will be slid into engagement with the gear 53 loosely mounted upon the shaft 49 and meshing with the teeth 20 of the gear 16. This shaft 49 which has its inner end rotatably supported in bearing 54 will then be rotated and through the medium of gear 55, rotary movement will be transmitted to the shaft 15. The shaft will then rotate in the reverse direction. It will thus be seen that the automobile may be driven forwardly either at low speed or may be driven rearwardly.

This shifting lever is further provided with arms 56 and 57 which extend at right angles to the arms 37 and 44 and carry depending links 58 and 59 which links extend into the housing as shown in Fig. 2. The link 58 is provided with branch links 60 and 61 and the link 59 with branch links 62 and 63. The links 60 and 63 are connected with the bearings 64 for the outer ends of the shafts 29 and 30 which shafts have their inner ends journaled in the sleeve 13. Gears 65 and 66 are loosely mounted upon the shafts 29 and 30 and mesh with the teeth 18 and 17 of the gear plate 16. Clutches 67 and 68 are mounted upon the shafts 29 and 30 and are engaged by the collars 69 and 70 with which the links 61 and 62 are connected. It will thus be seen that if the shifting lever is moved to bring the clutch 67 into operative engagement with the gear 65, the shaft 29 will be rotated and rotary motion transmitted to shaft 15 at intermediate speed through the medium of the gear 71. It will be further seen that if the shifting lever is swung in the opposite direction, to move the clutch 67 out of engagement with gear 65 and move clutch 68 into engagement with gear 66 as shown in Fig. 2, the shaft 30 will be rotated and rotary movement transmitted to the shaft 15 at low speed through medium of gear 72 which meshes with gear 21.

With this transmission mechanism in use, the engine shaft can be allowed to rotate without the shaft 15 being rotated by leaving the shifting lever 38 in a vertical position or the shaft 15 may be rotated to drive the machine rearwardly by moving the shifting lever in one direction or if it is desired to go forwardly, the shaft 15 may be rotated in the forward direction of rotation at a determined rate of speed either low, medium or high by moving the shifting lever in the proper direction. Any suitable means may be provided for releasably holding the shifting lever in the adjusted position. It will thus be seen that a transmission has been provided which will be very effective in operation and which will be very compact and which will be strong and durable and not liable to easily get out of order or need repair.

What is claimed is:—

1. A transmission mechanism comprising a housing, a supporting shaft rotatably mounted in said housing, a gear rigidly mounted upon the supporting shaft, a second gear rigidly mounted upon the supporting shaft, a gear disk rotatably mounted upon the supporting shaft between the first and second mentioned gears and provided upon one face with an outer and intermediate and an inner row of gear teeth and upon the other face with a row of gear teeth, a drive shaft extending into said housing and provided with a gear meshing with the second gear of the supporting shaft, a shaft rotatably mounted in said housing, a gear carried by the shaft and meshing with the second gear of the supporting shaft, a gear loosely mounted upon the last mentioned shaft and engaging the last mentioned gear teeth of the gear disk, a clutch carried by the last mentioned shaft for engaging the loose gear, an engine shaft extending into the housing and provided with a gear engaging the outer row of gear teeth of the gear disk, shafts rotatably mounted in the housing, gears carried by the shafts and meshing with the first mentioned gear of the supporting shaft, gears carried by the last mentioned shafts and meshing with the outer, intermediate and inner rows of gear teeth of said gear disk, one gear of each last mentioned shaft being rigid thereon and the second loosely mounted, clutches mounted upon the last mentioned shafts for locking the loose gears thereon, and means for selectively moving the clutches into an operative position.

2. A transmission mechanism comprising a housing, a supporting shaft rotatably mounted in the housing, gears rigidly mounted upon the supporting shaft, a gear plate rotatably mounted upon the supporting shaft, and provided upon one face with a row of gear teeth and upon the second face with a plurality of rows of gear teeth, a driving shaft extending into the housing and having a gear meshing with one of the rigid gears of the supporting shaft, a rotatable shaft provided with a rigid gear meshing with the first mentioned rigid gear of the driving shaft and with a loose gear meshing with the single row of gear teeth of the gear plate, a clutch for the loose gear slidably mounted upon the shaft, rotatable shafts mounted in the housing, each provided with a rigid gear and with a loose gear and having one of its gears meshing with the second rigid gear of the supporting shaft and its second gear with one of the plurality of rows of gear teeth of said gear plate, clutches for the loose gears slidably mounted upon the shaft, an actuating lever pivotally connected with said housing, arms extending from the actuating lever, depending links pivotally connected with said arms, collars carried by said clutches, and branch links pivotally connected with said depending links and with said collars for moving the clutches into and out of an operative position as said actuating lever is moved.

3. A transmission mechanism comprising a housing, a supporting shaft rotatably mounted in the housing, an engine shaft extending into the housing, a drive shaft extending into the housing, means for transmitting rotary movement from the engine shaft to the drive shaft including loosely mounted gears, slidably mounted clutches for locking the loosely mounted gears, an actuating lever pivotally connected with said housing for universal movement, arms extending from the actuating lever, links pivotally connected with the arms and extending into the housing, and branch links pivotally connected with the first mentioned links and connected with said clutches whereby movement of the lever will move the clutches into and out of engagement with the loosely mounted gears.

4. A transmission mechanism comprising a housing, a supporting shaft rotatably mounted in said housing, gears rigidly mounted upon the supporting shaft, a gear plate loosely mounted upon the supporting shaft between the rigid gears, a driving shaft extending into the housing and having a gear in operative engagement with one of the rigid gears of the supporting shaft, means for transmitting rotary movement from the gear disk to the rigid gear, an engine shaft extending into the housing and having a gear in operative engagement with the gear disk for rotating the same, means for transmitting rotary movement from the gear disk to the second rigid gear of the supporting shaft, the means for transmitting rotary movement from the gear disk to the rigid gears of the supporting shaft each including a clutch and a loosely mounted gear, and means for selectively moving the clutches into and out of operative engagement with their respective gears.

5. A transmission mechanism comprising a housing, a driving shaft extending into the housing, an engine shaft extending into the housing, means for transmitting rotary movement from the engine shaft to the driving shaft including loosely mounted gears, clutches for said gears, links connected with said clutches, an actuating lever pivotally mounted and having arms extending therefrom, and links pivotally connected with the arms of said lever and with the links of said clutches for moving the clutches into and out of an operative position as said lever is moved.

6. A transmission mechanism comprising a housing, a driving shaft extending into the housing, an engine shaft extending into the housing, means for transmitting rotary movement from the engine shaft to the driving shaft including loosely mounted gears and clutches for the gears, an actuating lever pivotally connected with the housing and having arms extending therefrom, and links connecting the arms of the lever with the clutches whereby movement of the actuating lever in a predetermined direction, will move one clutch to an operative position and the second clutch to an inoperative position.

In testimony whereof I affix my signature in presence of two witnesses.

MARSHALL BARNHOUSE.

Witnesses:
J. C. MONTAG,
N. W. SCHMIT.

Copies of this patent may be obtained for five cents each, by addressing the "Commissioner of Patents, Washington, D. C."